Nov. 4, 1958 C. F. DOANE 2,858,581
EXPANDABLE VEHICLE TRAILER
Filed March 29, 1956 4 Sheets-Sheet 1
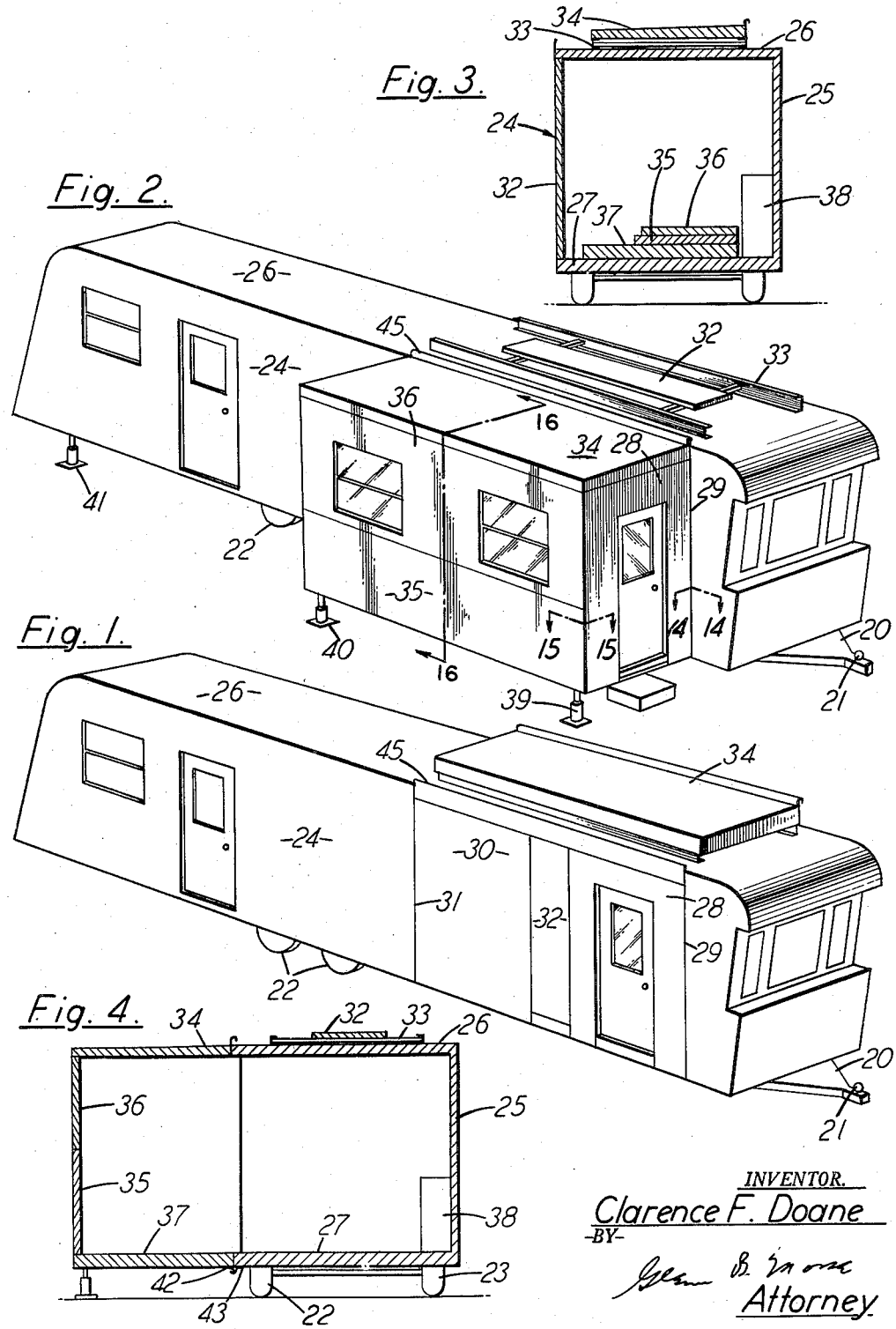
INVENTOR.
Clarence F. Doane
BY
Attorney Nov. 4, 1958 C. F. DOANE 2,858,581
EXPANDABLE VEHICLE TRAILER
Filed March 29, 1956 4 Sheets-Sheet 2
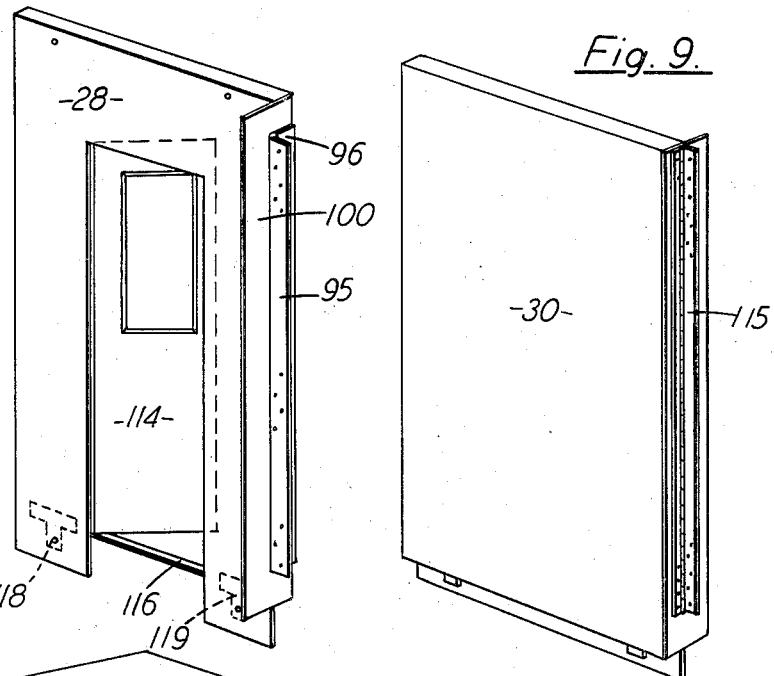
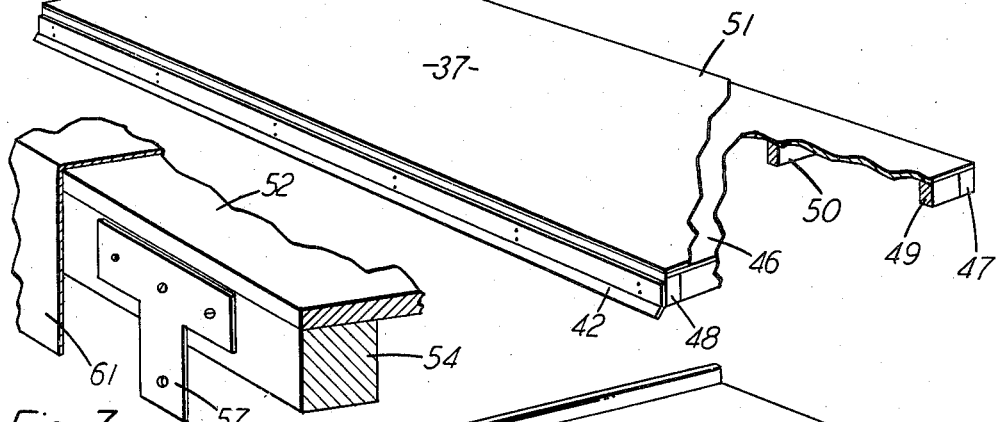
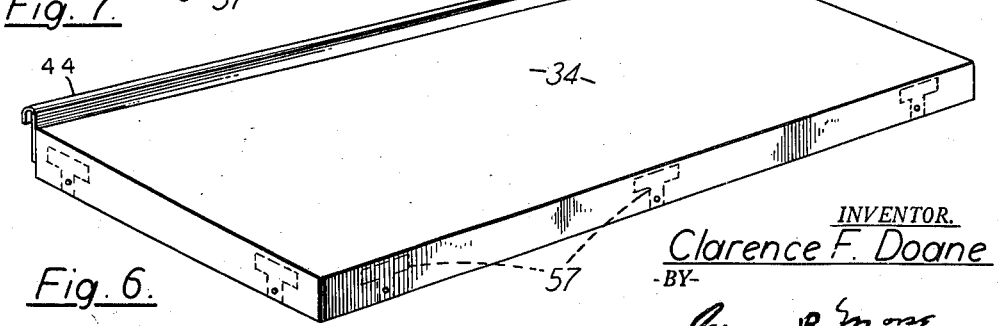
INVENTOR.
Clarence F. Doane Nov. 4, 1958  C. F. DOANE  2,858,581
EXPANDABLE VEHICLE TRAILER
Filed March 29, 1956  4 Sheets-Sheet 3
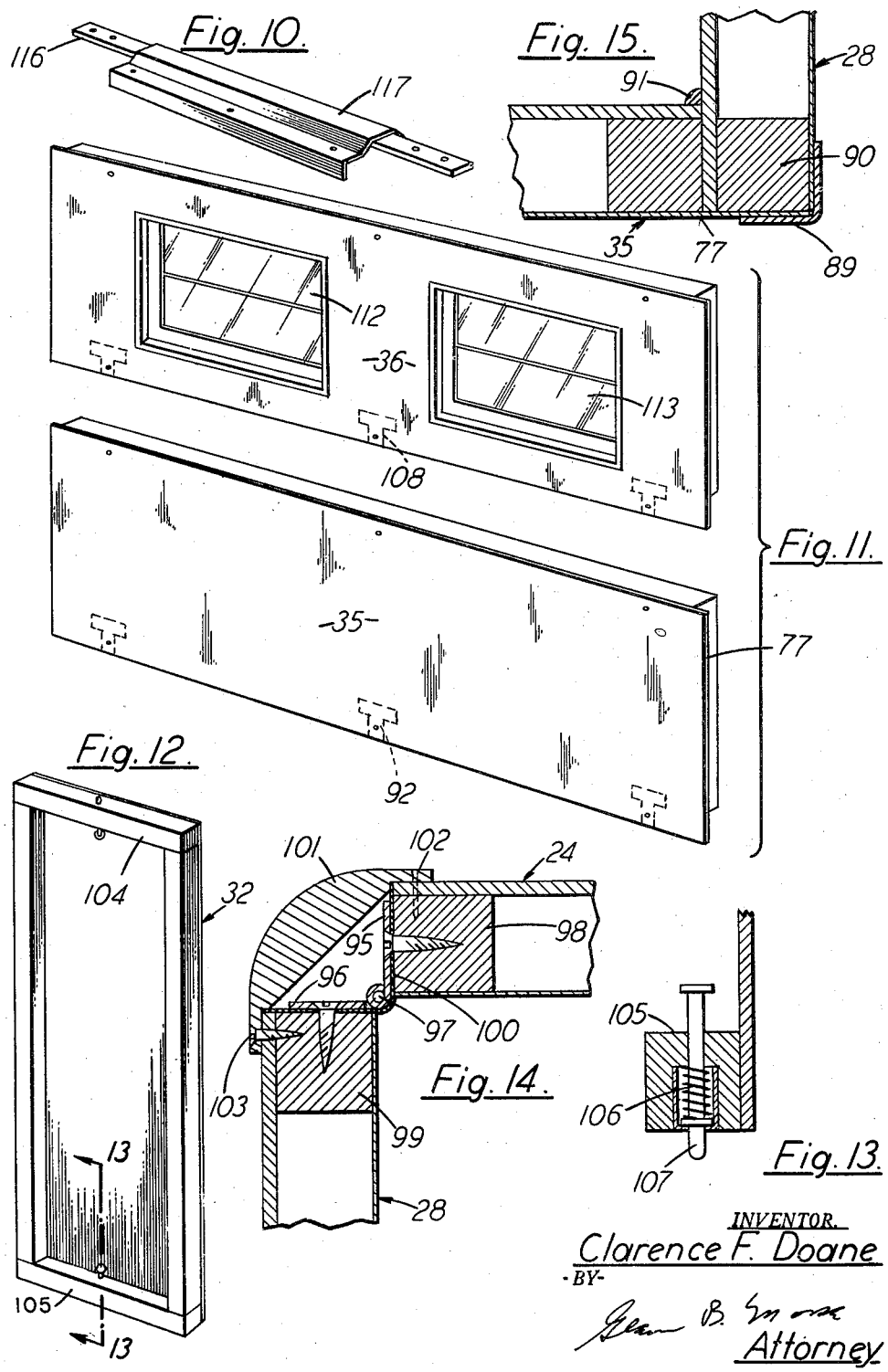
INVENTOR.
Clarence F. Doane
BY
Attorney

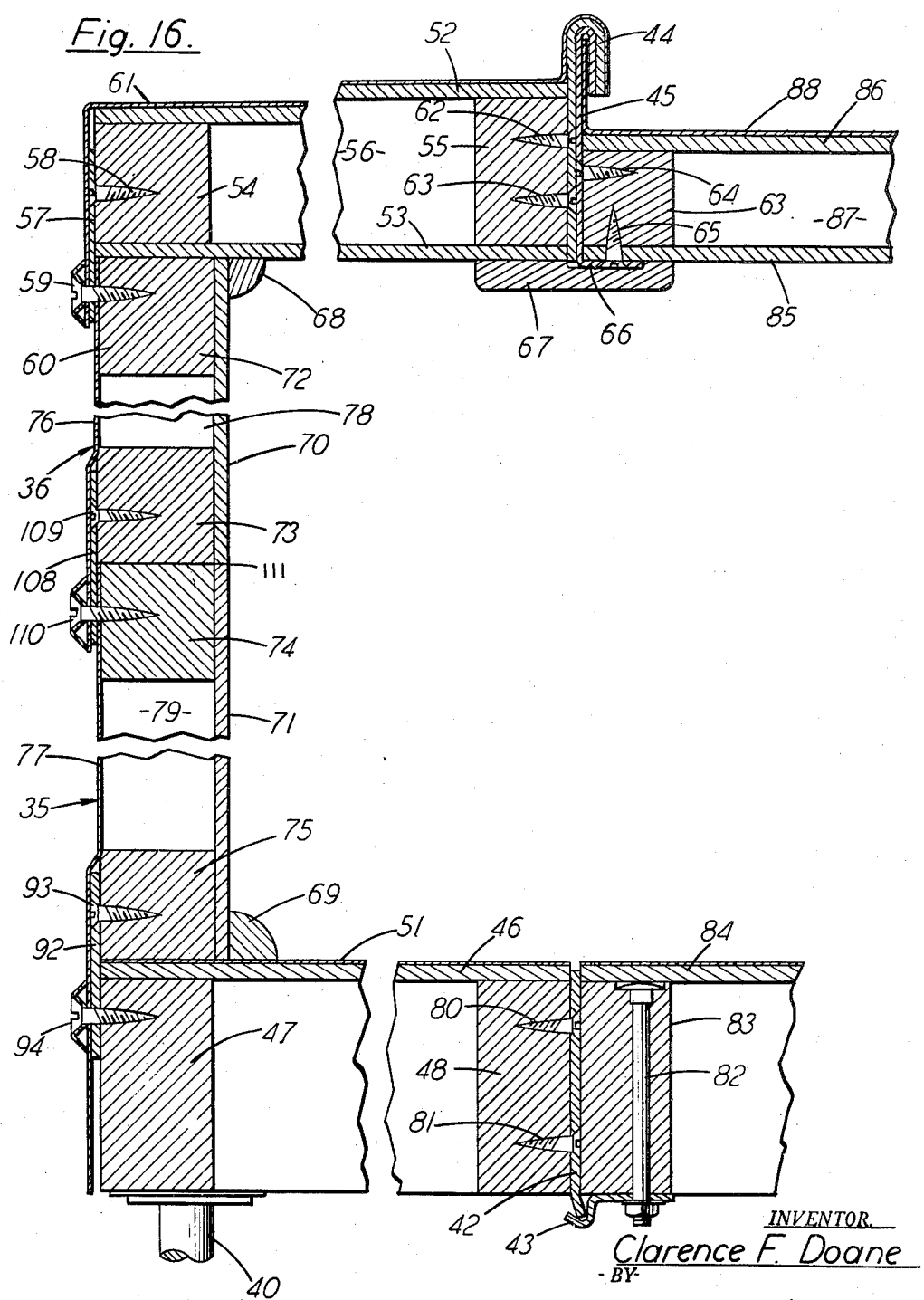

United States Patent Office 2,858,581
Patented Nov. 4, 1958

2,858,581
EXPANDABLE VEHICLE TRAILER
Clarence F. Doane, Belmont, Mich.

Application March 29, 1956, Serial No. 574,693

4 Claims. (Cl. 20—2)

This invention relates to the construction of vehicle trailers which provide living accommodations. These units are designed to be towed behind automobiles along the highway, and provide what amounts to a movable residence. The development of these trailers into elaborate units of extended lengths reflects the fact that the average "residence" trailer is actually on the highway a very minor portion of its useful life. Instead of providing living quarters which continually accompany the owner in his automobile, it is the usual practice to move such a trailer to a park area where it becomes semi-permanent housing. Statistics show that perhaps once a year, on the average, a trailer is moved from one location to another. At each location, the unit is connected into electric power and septic tank systems, and the trailer is ordinarily "blocked up" to relieve the loading on the tires, and to provide greater stability.

A very troublesome design limitation which has affected the development of these units is the fact that almost every State has a width limitation which prevents the transverse dimension of the trailer from exceeding eight feet on the outside. As a result, any increase in the accommodations of the trailer must be accompanied by an increase in the length, which is also subject to statutory limitations. The present invention provides a possibility for vastly increasing the lateral dimensions of the trailer when in condition for the use of its interior facilities without in any way affecting its compliance with State highway regulations. This increase in the accommodative capacity of the trailer is provided by a displaceable section of sidewall of the trailer which, together with a system of auxiliary panels, makes it possible for the trailer owner to construct in a few minutes an addition to his trailer which will almost double the floor space of the living room area. The several features of this invention will be discussed in detail through an analysis of the particular embodiments illustrated in the accompanying drawings. In the drawings:

Figure 1 is a perspective view of a trailer embodying this invention when in the closed or highway condition.

Figure 2 presents a perspective view showing the same trailer as in Figure 1, but extended to form an expanded living room area.

Figure 3 is a schematic view showing the cross section of the trailer when in the condition shown in Figure 1.

Figure 4 is a schematic view showing the expanded condition of the trailer.

Figure 5 is a perspective view of the auxiliary floor panel utilized in the invention, with a portion broken away to show the interior structure.

Figure 6 shows a perspective view of the auxiliary roof panel.

Figure 7 is an enlarged fragmentary section showing the construction at the corner along the edge of the auxiliary roof panel.

Figure 8 is a perspective view of the front hinged wall section of the trailer which includes the doorway.

Figure 9 is a perspective view of the rear hinged wall section of the trailer.

Figure 10 is a perspective view showing the threshold associated with the doorway shown in Figure 8.

Figure 11 presents an exploded view showing the two auxiliary wall sections which together define the outermost wall of the addition to the trailer.

Figure 12 is a perspective view showing the central wall panel between the hinged sidewall sections (which is stored when the unit is in the extended condition).

Figure 13 presents a section on an enlarged scale on the plane 13—13 of Figure 12.

Figure 14 is a section on an enlarged scale taken on the plane 14—14 of Figure 2.

Figure 15 is a section on an enlarged scale taken on the plane 15—15 of Figure 2.

Figure 16 is an enlarged fragmentary section taken on the plane 16—16 of Figure 2.

Referring to the drawings, a trailer having a tongue 20 and a coupling hitch 21 is mounted on wheels shown at 22 and 23. The sidewalls 24 and 25, the roof 26, and the floor 27 enclose living quarters which may be arranged to suit the taste of the user. A front panel 28 is hinged at the position indicated at 29 to the sidewall 24 (refer to Figure 1), and the rear panel 30 is hinged to the sidewall 24 as indicated at 31. A central panel 32 is positioned between the hinged panels, and is removable bodily from its position shown in Figure 1. When the trailer is extended from the condition shown in Figure 1 to that shown in Figure 2, the hinged panels 28 and 30 are swung approximately 90 degrees about their respective hinge lines, and the removable panel 32 is placed in storage position on the rack 33 on the roof 26 of the trailer. The hinged panels 28 and 30, together with the removable panel 32, together constitute a displaceable section of the sidewall 24.

After the panels 28 and 30 have been swung outwardly into extended position, the construction of the "addition" to the trailer is completed by the assembly of the auxiliary roof panel 34, the lower auxiliary wall panel 35, the upper auxiliary wall panel 36, and the auxiliary floor panel 37. Prior to the extension of the trailer, the auxiliary panels had been stored in the position shown in Figure 3. It frequently occurs that the presence of such built-in items as a sink, refrigerator, stove, or similar equipment in the position indicated at 38 in Figures 3 and 4 has the effect of limiting the remaining available floor space on which such panels could be stored within the vehicle. Handling problems interfere with the excessive use of the roof for storage purposes, and the addition to the height of the vehicle may well present a limitation to roof-storage of the panels. The limit of the available floor space within the vehicle is such that it is impractical to store a single wall panel which would extend the full height of the room when erected. This problem is solved by this invention by the splitting of the outer wall panel into the upper and lower panels 36 and 35, which are easily stored and handled to and from the position shown in Figure 3.

When the unit is extended, a pair of jacks as shown at 39 and 40 are installed in position to support the outer edge of the auxiliary floor panel 37. These jacks are in addition to the conventional installation of jacks as shown in the position indicated at 41 for supporting the principal weight of the trailer. The inner edge of the auxiliary floor panel 37 is supported in the extended position by the interengagement of the fittings 42 (secured to the panel 37) and 43 (part of the fixed structure of the trailer). The outer edge of the auxiliary roof panel 34 is supported by the wall panels 35 and 36, and the inner edge by the engagement of the hook-shaped fitting 44 on the roof panel with the projection 45 mounted permanently on the vehicle.

In view of the fact that the adjustment of the trailer from the contracted to extended position is a relatively infrequent procedure, it is not necessary to use a type of fastening which can be snapped in and out of engagement in an instant. The use of such couplings or fastenings usually complicates the design of the structure not only in view of the mechanism involved, but also as a result of the necessity of providing for concentration of stresses at such fastenings. Applicant has found it entirely adequate to utilize conventional screw fastenings at pre-drilled positions. An adequate number of such fastenings will serve to securely connect the various panels involved at frequent enough positions to assure the provision of an adequate seal against the weather. The structural details of the various components of the device are adapted for this type of fastening, as will be evident from an examination of Figures 5 through 16. The auxiliary floor panel illustrated in perspective in Figure 5 is preferably constructed from a sheet of plywood 46 stiffened by a framework including the side rails 47 and 48 and a series of spaced cross members as shown at 49 and 50. A sheet of flooring material indicated at 51 is preferably also included. The metal strip 42 is secured to the side rail 48.

Referring to Figures 6 and 16, the auxiliary roofing panel 34 is constructed in a generally similar fashion to the auxiliary floor panel 37. Upper and lower plywood sheets 52 and 53, respectively, are mounted on a framework including the siderails 54 and 55, which are interconnected by a series of cross members as indicated at 56 in Figure 16. A series of T-shaped fittings 57 are secured to the siderail 54 by screws as indicated at 58, the lower extremity of these fittings being engaged by screws 59 which enter into the rail 60 of the upper sidewall panel unit 36. A sheet of roofing 61 is preferably applied over the auxiliary roof panel unit, and is continuous over the junction fittings 44 and 45 to maintain proper drainage characteristics. The hook-shaped fitting 44 is secured to the rail 55 by screws as shown at 62 and 63, the mating fitting 45 being secured to the rail 63 by the screws 64, and also by a group of screws 65 engaging the lower flange 66. A molded cap strip 67 is placed in the position indicated in Figure 16 to cover these fastenings. This strip may be permanently secured to the roof panel, and the corner moldings 68 and 69 may in similar fashion be permanently secured to the upper and lower sidewall panels 36 and 35, respectively. The structure of the sidewall panels preferably includes an inner facing panel of plywood as shown at 70 and 71, upper and lower rails 72—73 and 74—75 (interconnected by suitable vertical members), and sheet metal outer covering material 76 and 77. The interior of the panels between the vertical members 78 and 79 in the respective panels may be filled with insulation, if desired. Figure 16 also illustrates the attachment of the fitting 42 with the screws 80 and 81. The member 43 is held in position by the bolts 82 which traverse the side rail 83 of the floor system of the trailer. A top panel 84 represents the floor structure. The ceiling panel 85 is separated from the outer panel 86 by a framework including the cross members 87, and the roof assembly is covered by a layer of roofing material indicated at 88.

The attachment of the panels at the outer corners of the extension is illustrated in Figure 15. The hinged panel 28 (constructed in a similar fashion to the other panels previously described) is preferably overlapped at its end by the material forming the outer covering sheets 76 and 77 (referring back to Figure 16). An angle strip 89 seals the corner of the structure, and suitable screws (not shown) are preferably utilized to interconnect the edge of the metal sheet 77 with the edge rail 90 of the hinged panel 28. A corner molding 91 may be either secured permanently to one or the other of the panels, or may be independently secured in position with suitable fastenings. At the bottom of the lower side panel 35, a series of T-shaped connecting plates as indicated at 92 are similar in form and function to the connecting members 57 used in securing the auxiliary roof panel in position. Screws 93 engage the lower rail 75 of the side panel 35, and the screws 94 engage the edge rail 47 of the auxiliary floor panel. The covering sheet 77 extends downwardly opposite the rail 47 for purposes of preserving appearance.

The junction of the hinge panels 28 and 30 with the fixed sidewall structure of the trailer is best shown at Figure 14. A hinge which includes the leaves 95 and 96 (connected by the pin 97) is secured to the edge rail 98 of the sidewall 24, and to the edge rail 99 of the hinge panel 28. A layer of cloth or other flexible sheet material 100 is preferably positioned around the hinge to preserve a seal. After the hinge panels 28 and 30 have been placed in the extended position, a special corner molding 101 may be fastened in place with screws as shown at 102 and 103 to provide a smooth contour across the inside of the interior. The structure in the interior of the hinge panels 28 and 30, and the sidewall 24, is generally similar to that shown in Figure 16.

After the hinge panels 28 and 30 have been swung out to the extended position, the central panel 32 is preferably placed in storage position on top of the trailer on the rack 33, as shown in Figure 2. Figure 12 presents an inside perspective view of the removable panel 32, and Figure 13 illustrates a simple locking mechanism for maintaining the removable panel in position. The upper and lower rails 104 and 105 are bored out to receive a spring-loaded plunger assembly 106, the outer projections of which (indicated at 107) are received within suitable recesses in the fixed floor and roof structure of the trailer. The panel 32 is easily unlocked for removal by lifting the plunger assembly 106 to the point where the projection 107 is disengaged.

The upper and lower outer wall panels 36 and 35 are joined at their meeting edges with the same structure as is provided at the junction of the roof panel and outer wall panel. T-shaped connecting plates 108 are secured to the rail 73 of the upper panel by screws as shown at 109 (refer to Figure 16), and to the rail 74 by the screws 110. The covering sheet 76 of the upper wall panel extends down over the junction plane 111 to assure an effective seal and proper drainage, and also provides effectively for the transfer of stresses uniformly along the panels. Windows 112 and 113 are preferably provided in the upper panel unit 36.

Referring to Figures 8 and 9, the hinged panels 28 and 30 are similar in construction, except for the provision of the door 114 centrally within the area of the hinge panel 28. The continuous piano hinge 115 connecting the panel 30 to the sidewall 24 is mounted in the same manner as shown in Figure 14. A metal strap 116 connects the lower extremities of the panel 28 across the opening of the door 114, and this strap is covered by a threshold formation of sheet metal (indicated at 117 in Figure 10) after the trailer has been assembled in the extended condition. This threshold strip (117) is secured to the auxiliary floor panel, preferably with suitable screw fastenings. T-shaped connecting members as shown at 118 and 119 are also used on the hinged panels 28 and 30 to serve as connections to the auxiliary floor panel 37.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. An expandable trailer vehicle having living quarters therein, and including a floor, sidewalls, and a roof, said trailer comprising: at least three displaceable wall panels forming a continuous section of one of said sidewalls, the foremost and rearmost of said displaceable panels being hinged to fixed portions of said sidewalls and shorter in the front-to-rear direction than the inside floor width of said trailer at said sidewall section, one of said hinged panels having a door centrally disposed therein; two auxiliary wall sections, each having a length substantially equal to the length of said sidewall section, the height of said auxiliary wall sections together being substantially equal to the height of said sidewall section with one of said auxiliary sections superimposed on the other; an auxiliary floor panel receivable on the exposed floor area within said trailer opposite said sidewall section, said floor panel having a length equal to that of said sidewall section and having a width equal to the length of each of said two displaceable wall panels at the respective ends of said floor panel; an auxiliary roof panel having a length equal to that of said sidewall section and a width equal to the length of each of said displaceable wall panels at the respective ends of said roof panel; and detachable fastening means uniting said panels including interengageable coupling strips on said trailer roof and on said auxiliary roof panel, respectively, and on said trailer floor structure and on said auxiliary floor panel, respectively.

2. An expandable trailer vehicle having living quarters therein, and including a floor, sidewalls, and a roof, said trailer comprising: at least three displaceable wall panels forming a continuous section of one of said sidewalls, the foremost and rearmost of said displaceable panels being hinged to fixed portions of said sidewalls and shorter in the front-to-rear direction than the inside floor width of said trailer at said sidewall section, one of said hinged panels having a door centrally disposed therein; two auxiliary wall sections, each having a length substantially equal to the length of said sidewall section, the height of said auxiliary wall sections together being substantially equal to the height of said sidewall section with one of said auxiliary sections superimposed on the other; an auxiliary floor panel receivable on the exposed floor area within said trailer opposite said sidewall section, said floor panel having a length equal to that of said sidewall section and having a width equal to the length of each of said two displaceable wall panels at the respective ends of said floor panel; an auxiliary roof panel having a length equal to that of said sidewall section and a width equal to the length of each of said displaceable wall panels at the respective ends of said roof panel; and detachable fastening means uniting said panels.

3. An expandable trailer vehicle having living quarters therein, and including a floor, sidewalls, and a roof, said trailer comprising: displaceable wall panels forming a substantially continuous section of one of said sidewalls, two of said displaceable panels being hinged to fixed portions of said sidewalls and shorter in the front-to-rear direction than the inside floor width of said trailer at said sidewall section; two auxiliary wall sections, each having a length substantially equal to the length of said sidewall section, the height of said auxiliary wall sections together being substantially equal to the height of said sidewall section with one of said auxiliary sections superimposed on the other; an auxiliary floor panel receivable on the exposed floor area within said trailer opposite said sidewall section, said floor panel having a length equal to that of said sidewall section and having a width equal to the length of each of said two displaceable wall panels at the respective ends of said floor panel; an auxiliary roof panel having a length equal to that of said sidewall section and a width equal to the length of each of said displaceable wall panels at the respective ends of said roof panel; and detachable fastening means uniting said panels.

4. An expandable trailer vehicle including a floor, sidewalls, and a roof, said trailer comprising: displaceable wall panels forming a substantially continuous section of one of said sidewalls, two of said displaceable panels being shorter in the front-to-rear direction than the inside floor width of said trailer at said sidewall section; two auxiliary wall sections, each having a length substantially equal to the length of said sidewall section, the height of said auxiliary wall sections together being substantially equal to the height of said sidewall section with one of said auxiliary sections superimposed on the other; auxiliary floor panel means receivable on the exposed floor area within said trailer opposite said sidewall section, said floor panel means having a length equal to that of said sidewall section and having a width equal to the length of each of said two displaceable wall panels at the respective ends of said floor panel means; auxiliary roof panel means having a length equal to that of said sidewall section and a width equal to the length of each of said displaceable wall panels at the respective ends of said roof panel means; and detachable fastening means uniting said panels.

References Cited in the file of this patent

UNITED STATES PATENTS

| | | |
|---|---|---|
| 2,155,876 | Stout | Apr. 25, 1939 |
| 2,395,691 | Smith | Feb. 26, 1946 |
| 2,760,238 | Lane | Aug. 28, 1956 |